(12) United States Patent
Marshall et al.

(10) Patent No.: US 8,046,744 B1
(45) Date of Patent: Oct. 25, 2011

(54) SYSTEM AND METHOD FOR MEASURING LATENCY IN A CONTINUOUS PROCESSING SYSTEM

(75) Inventors: Ian D. Marshall, Sunnyvale, CA (US); Aleksey Sanin, Sunnyvale, CA (US); Mark Tsimelzon, Sunnyvale, CA (US); Robert B. Hagmann, Palo Alto, CA (US)

(73) Assignee: Sybase, Inc., Dublin, CA (US)

( * ) Notice: Subject to any disclaimer, the term of this patent is extended or adjusted under 35 U.S.C. 154(b) by 854 days.

(21) Appl. No.: 12/148,903

(22) Filed: Apr. 23, 2008

Related U.S. Application Data

(60) Provisional application No. 60/926,473, filed on Apr. 27, 2007.

(51) Int. Cl.
*G06F 9/44* (2006.01)
(52) U.S. Cl. ..................................................... 717/128
(58) Field of Classification Search .................... 717/128
See application file for complete search history.

(56) References Cited

U.S. PATENT DOCUMENTS

| | | | |
|---|---|---|---|
| 7,051,339 B2 * | 5/2006 | Deverill et al. | 719/328 |
| 7,154,858 B1 * | 12/2006 | Zhang et al. | 370/252 |
| 7,383,253 B1 | 6/2008 | Tsimelzon et al. | |
| 2002/0095399 A1 | 7/2002 | Devine et al. | |
| 2003/0065769 A1 * | 4/2003 | Kryskow et al. | 709/224 |
| 2003/0212699 A1 | 11/2003 | Denesuk et al. | |
| 2005/0267871 A1 | 12/2005 | Marchisio et al. | |
| 2006/0129458 A1 | 6/2006 | Maggio | |
| 2008/0005354 A1 * | 1/2008 | Kryskow et al. | 709/238 |
| 2008/0049633 A1 * | 2/2008 | Edwards et al. | 370/252 |
| 2008/0244086 A1 * | 10/2008 | Patel | 709/238 |

OTHER PUBLICATIONS

Saroiu et al. "A Measurement Study of Peer-to-Peer File Sharing Systems",2002, Citeseer.*
Endo et al. "Using Latency to Evaluate Interactive System Performance", 1996, eecs Harvard University.*
Abadi, Daniel J. (2003) Aurora: a new model and architecture for data stream management. The VLDB Journal; Published online 2003—Springer-Verlag. Digital Object Identifier (DOI) 10.1007/s00778-003-0095-z, 20 pages.
Arasu, A. et al., STREAM: The Stanford Data Stream Management System, Book chapter, Mar. 15, 2004, Book to be edited by Garofalakis, Gehrke, and Rastogi, 21 pages.
Duran-Limon, Hector A. et al., "Resource Management for the Real-Time Support of an Embedded Publish/Subscribe System," (no date), www.comp.lancs.ac.uk/research/mpg/projects, 13 pages.
Krishnamurthy, Sailesh et al. TelegraphCQ: An Architectural Status Report, IEEE Data Engineering Bulletin, Mar. 2003, 8 pages.
Sundaresan, Srikrishnan et al., "Schema Integration of Distributed Databases Using Hyper-Graph Data Model," 2005, IEEE, 6 pages.
Celequest, Celequest: Products: Streaming DataFlow Engine, http://www.celequest.com/products/tec_streamingdfe.asp, visited Jul. 24, 2004, 2 pages.

* cited by examiner

*Primary Examiner* — Wei Zhen
*Assistant Examiner* — Junchun Wu
(74) *Attorney, Agent, or Firm* — Sterne, Kessler, Goldstein & Fox P.L.L.C.

(57) ABSTRACT

The present invention provides a system and method for measuring latency in a continuous processing system. The invention involves generating "tracer" messages that are specifically designed for measuring latency. A tracer message is configured to pass through and be outputted by each primitive in the tracer message's path regardless of the function of the primitive and without changing the state of the primitive. Tracer messages are not filtered by filter primitives or delayed by time-delay primitives. Tracer messages are detected and discarded within loops. These rules provide for predictable behavior of tracer messages, thereby making them reliable indicators of latency and liveness in the continuous processing system. A tracer message is inserted into the continuous processing system at a desired start point for measuring latency. At a desired end point for measuring latency, latency is measured by calculating the amount of time the tracer message took to travel from the start point to the end point.

15 Claims, 3 Drawing Sheets

SYSTEM AND METHOD FOR MEASURING LATENCY IN A CONTINUOUS PROCESSING SYSTEM

RELATED APPLICATIONS

This application claims the benefit of U.S. Provisional Application No. 60/926,473 filed on Apr. 27, 2007 with inventors Ian D. Marshall, Aleksey Sanin, Mark Tsimelzon and Robert Hagmann, and titled "System and Method for Measuring Latency in a Continuous Processing System," the contents of which are incorporated by reference as if fully disclosed herein.

BACKGROUND OF THE INVENTION

1. Field of the Invention

This invention relates generally to continuous processing systems that process streaming data, and, more specifically, to measuring latency in a continuous processing system.

2. Description of the Background Art

A continuous processing system processes streaming data. It includes statements (such as queries), written by programmers, which operate continuously on input data streams and which publish to output data streams.

When statements written by programmers are compiled, an execution graph may be created, where the execution graph is comprised of connected primitives that correspond to the compiled statements. An execution graph in a continuous processing system specifies the path for processing messages in accordance with the statements. In other words, the continuous processing system processes messages by "pushing" them through the execution graph.

For performance measurements, it is desirable to be able to measure latency in a continuous processing system. In particular, it is most desirable to be able to measure the total time it takes for a message generated by an "input adaptor" in the continuous processing system to travel though the execution graph and reach an "output adaptor." An input adaptor receives data from an external input source and conditions the data for processing by the continuous processing system. Data processed by an input adaptor is published as rows of messages into one or more data streams. Such data streams are input to a query processor. If input data to the query processor generates output (by nature of the particular query being run), the query processor publishes such output to one or more output data streams. An output adaptor subscribes to one or more output data streams and conditions data in such streams for an external output destination.

A known method for measuring latency is to add tracking information to standard data messages. However, the problem with adding tracking information to data messages is that, data messages, by their nature are filtered, transformed, delayed or discarded on their way through the execution graph. In general, it is impossible to know if a particular input data message will generate an output message (especially when the execution graph includes a filter). This unpredictability makes calculating latency and detecting processing stalls very difficult.

Consequently, there is a need for a method for calculating latency that bypasses the unpredictability of the execution graph and allows for latency to be calculated reliably and easily.

BRIEF SUMMARY OF THE INVENTION

The present invention provides a system and method for measuring latency in a continuous processing system. The invention involves generating "tracer" messages that are specifically designed for measuring latency. A tracer message is configured to pass through and be outputted by each primitive in the tracer message's path regardless of the function of the primitive and without changing the state of the primitive.

A tracer message is inserted into the continuous processing system at a desired start point for measuring latency. To measure latency (as opposed to just "liveness"), a tracer message is inserted into a data stream at the same time as one or more data messages. Alternately, the tracer message is inserted after messages already queued and assigned the time of the last message in the queue.

The tracer message is pushed through the execution graph. If there are data messages in front of the tracer in an input queue of a primitive in the execution graph, the tracer message is processed after such data messages. Tracer messages are always outputted by every primitive. Tracer messages are not filtered out by filter primitives, and they are not delayed by time-delay primitives. If a duplicate of a tracer message is detected at a single primitive, the duplicate is discarded. For example, if a tracer message is detected in a loop, such message will be discarded, as it was already processed by the primitive to which the tracer message is looped back. Also, if two identical tracer messages are received at a joiner primitive, one such tracer messages will be discarded. These rules enable tracer messages to predictably travel through the execution graph.

At a desired end point for measuring latency, latency is measured by calculating the length of time the tracer message took to travel from the start point to the end point. An average running latency can be detected by periodically inserting tracer messages in the continuous processing system, and then calculating an average running latency.

Since tracer messages are designed to always make it through the execution graph and not be intentionally delayed by delay primitives, their behavior is predictable and thus can be used reliably to measure latency and "liveness" in the execution graph.

DETAILED DESCRIPTION OF THE PREFERRED EMBODIMENTS

Figure 1:
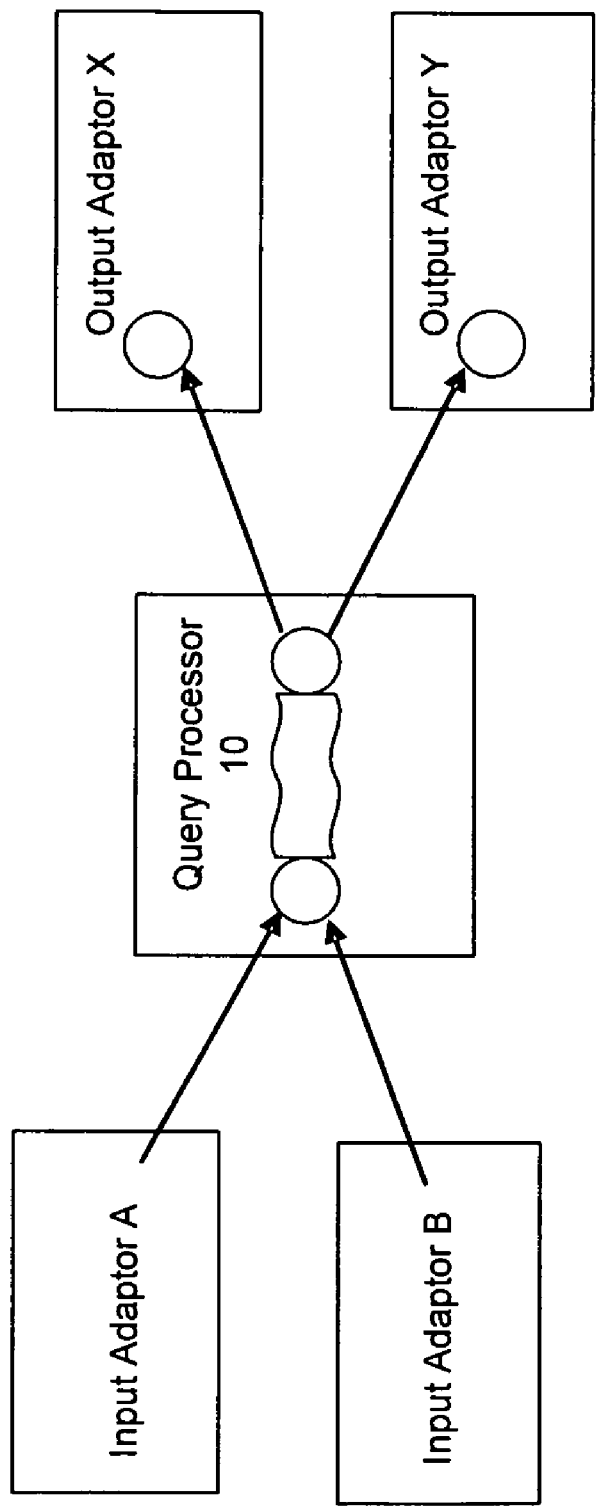
FIG. 1 is a block diagram that illustrates an example of a continuous processing system.

The present invention provides a system and method for measuring latency in a continuous processing system. FIG. 1 illustrates an example of a continuous processing system 100 that includes an Input Adaptor A, an Input Adaptor B, a Query Processor 10, and an Output Adaptor X and an Output Adaptor Y. Query Processor 10 receives streaming data and performs query processing operations on such streaming data on a continuous basis. Input Adaptors A and B generate messages into data streams that are processed by Query Processor 10. Output Adaptors X and Y receive the output of query processor 10. "End-to-end latency" in system 100 is the time it takes a message to travel from an Input Adaptor to an Output Adaptor.

Coral8, Inc.'s "Complex Event Processing" engine is an example of a query processor. Also, one embodiment of a continuous processing system is described in U.S. patent application Ser. No. 11/015,963, filed on Dec. 17, 2004 with Mark Tsimelzon as the first-named inventor, and titled "Publish and Subscribe Capable Continuous Query Processor for Real-time data streams," the contents of which are incorporated by reference as if fully disclosed herein.

Queries processed by a query processor may be written in a continuous-processing software language (CPL), which is sometimes also referred to as a continuous correlation language (CCL). An example of such a language described in the U.S. patent application Ser. No. 11/346,119, filed on Feb. 2, 2006, and titled "Continuous Processing Language for Real-time Data Streams," the contents of which are incorporated by reference as if fully disclosed herein.

When a software "module" (i.e., a coherent sequence of statements that include one more queries) are compiled in a continuous processing system, an execution graph is created for executing the module. The execution graph comprises a set of connected primitives, where the primitives correspond to statements in the module. (Note: Such correspondence is usually not a one-to-one correspondence.) Examples of primitives include filters, joiners, aggregators, and windows. Messages are processed by the query processor by sending the messages through the execution graph.

Figure 2:
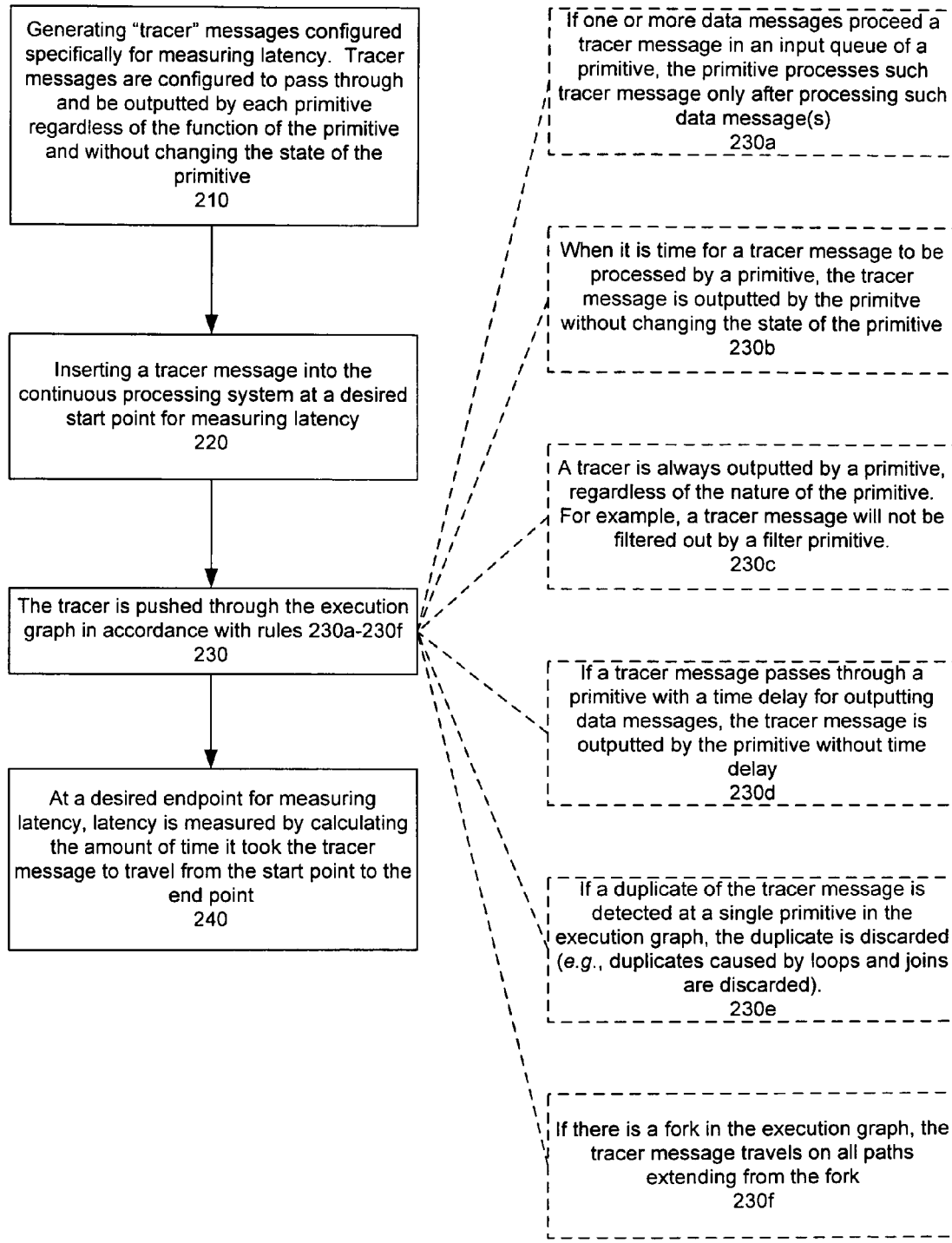
FIG. 2 is a flow chart that illustrates a method for measuring latency in a continuous processing system.

FIG. 2 illustrates a method for measuring latency in a continuous processing system. The method involves generating messages that are specifically designed for measuring latency (step 210). These messages are referred to as "tracer messages" herein. A tracer message is designed to pass through and be outputted by each primitive in the tracer message's path regardless of the function of the primitive and without changing the state of the primitive.

A tracer message is inserted into the continuous processing system at a desired start point for measuring latency (step 220). To measure latency (as opposed to just "liveness,") a tracer message is inserted into a data stream at the same time as one or more data messages. Alternately, the tracer message is inserted after messages already queued and assigned the time of the last message in the queue.

In one embodiment, incoming messages to the query processor are divided into "time slices." A time slice is a set of messages that have the same time stamp and that are processed together. Messages in a time slice enter the execution graph at the same time. In the preferred embodiment, if a time slice includes a tracer message, the tracer message is the last message in the time slice. Doing so measures the latency for all messages in the time slice.

The tracer message is pushed through the execution graph (230). In the preferred embodiment, the following rules apply to the processing of the tracer message in the execution graph:

If one or more data messages precede a tracer message in an input queue of a primitive, the primitive processes such tracer message only after processing such preceding data message(s) (230a).

When it is time for a tracer message to be processed by a primitive, the tracer message passes through and is outputted by the primitive without changing the state of the primitive (230b).

A tracer message is always outputted by a primitive, regardless of the nature of the primitive. For example, a tracer message will not be filtered out by a filter primitive (230c).

If a tracer message passes through a primitive with a time delay for outputting data messages, the tracer message is outputted by the primitive without the time delay (230d).

If a duplicate of the tracer message is detected at a single primitive in the execution graph, the duplicate is discarded (230e). For example, if a tracer message is detected in a loop, it will be deleted because such tracer message will be a duplicate. Also, if two duplicate tracer messages arrive at a joiner primitive, one of the duplicates will be discarded.

If there is a fork in the execution graph, the tracer message travels on all paths extending from the fork (230f).

At a desired end point for measuring latency, latency is measured by calculating the length of time the tracer message took to travel from the start point to the end point (step 240). An average running latency can be detected by periodically inserting tracer messages in the continuous processing system, and then calculating an average running latency.

In one embodiment, tracer messages are periodically inserted into an input stream of the continuous processing system, regardless of whether data messages are in the input stream. If a tracer message is inserted into a datastream with no data messages queued up in front of the tracer message, then the tracer message does not measure latency, but instead measures "liveness." If a tracer message does not reach the designated end point, then there is one or more "hung" primitives in the execution graph and the execution graph is not "live," but stalled (i.e., data messages will be stuck in one or more places).

Figure 3:
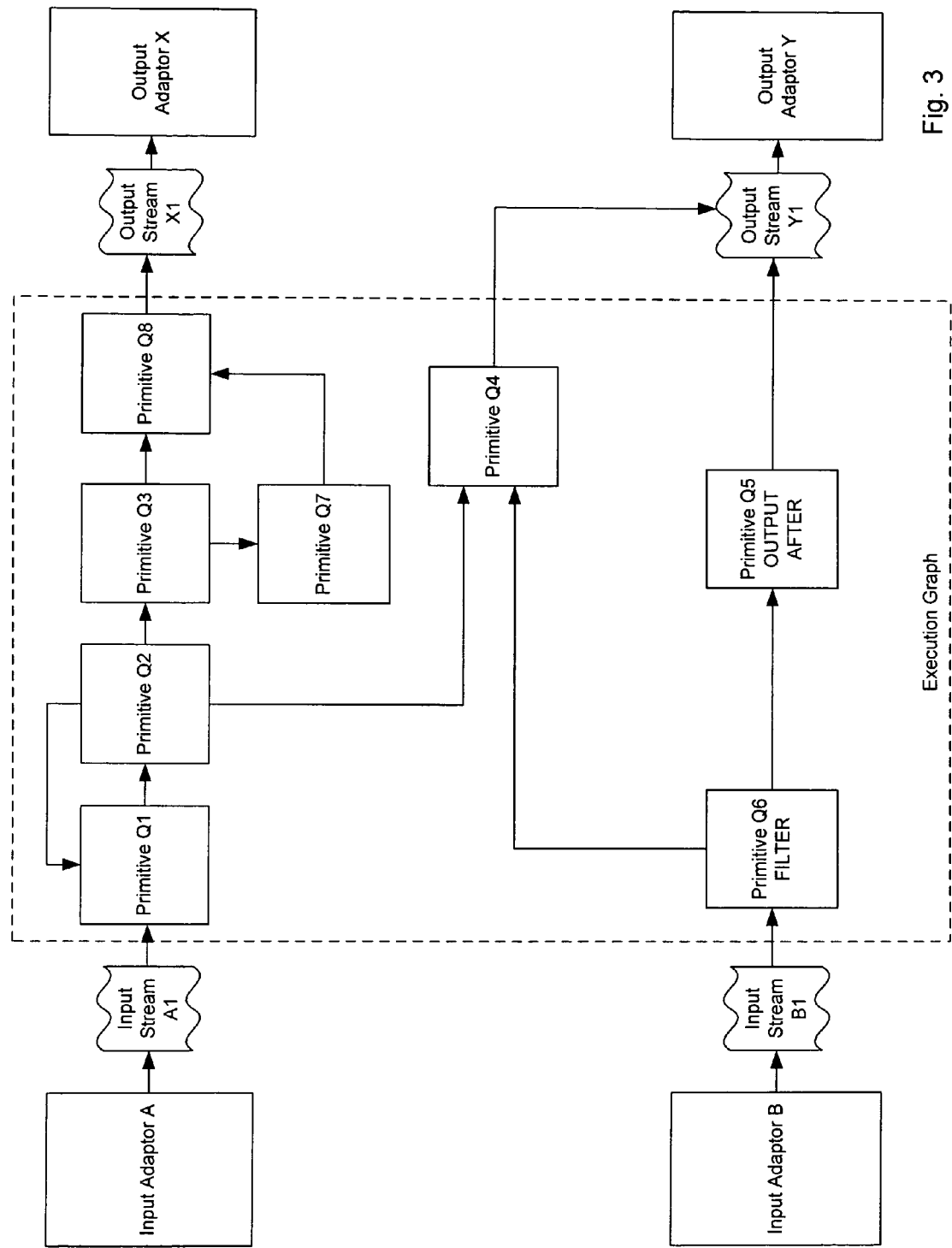
FIG. 3 is a block diagram that illustrates an example execution graph.

Examples of how tracer messages can be used to calculate latency are described with respect to the example execution graph displayed in FIG. 3. Boxes represent primitives and arrows are data streams. This execution graph works as follows:

Messages in input stream A1, generated by Input Adaptor A, can get to output stream X1 by following the arrows from input stream A1 to output stream X1.

Messages in input stream A1, generated by Input Adaptor A, can get to output stream Y1 following the arrows from input stream A1 to output stream Y1.

Messages in input stream B1, generated by Input Adaptor B, can get to output stream Y1 following the arrows from input stream B to output stream Y1.

Primitives Q1 and Q2 form a loop.

Primitive Q2 does a split: it sends messages to both Primitives Q3 and Q4.

Primitive Q3 does a split: it sends messages to both Primitives Q7 and Q8.

Primitive Q8 does a join: it receives messages from Primitives Q3 and Q7.

Primitive Q4 does a join: it receives messages from Primitives Q2 and Q6.

Primitive Q6 is a filter. A filter can filter out rows of data. In other words, it can receive a message and emit no corresponding output message. The output of Primitive Q6 goes to both Primitive Q4 and Q5.

Primitive Q5 is a delay query that delays messages.

Calculating Latency Between Input Stream al and Output Stream X1, and Input Stream A1 and Output Stream Y1.

Input Adaptor A inserts messages into Input Stream A1, and Input Adaptor B inserts messages into Input Stream B1. These messages queue up for processing by execution graph. Below is an example of what the queue might look like:

1:05:06.123000 Message on Input Stream A1
1:05:06.123000 Message on Input Stream A1
1:05:06.456000 Message on Input Stream B1
1:05:06.789000 Message on Input Stream A1
1:05:06.789000 Message on Input Stream A1
1:05:06.789000 Tracer on Input Stream A1

In this example, the first two messages have the same time stamp and are in the same time slice, and, consequently, these messages enter the execution graph at the same time. After these messages have gone through the execution graph, the next time slice (which is the third message, on input stream B1) then enters the execution graph. The last three messages, which includes a tracer message, are in the same time slice (referred to as "Time Slice Z") and enter the execution graph after the previous time slice (i.e., the third message) has gone through the execution graph.

After the first two messages in Time Slice Z have been processed by Primitive Q1, the tracer message passes through and is outputted by Primitive Q1. The same applies to Primitive Q2. Primitive Q2 has three output data streams: one forming a loop back to Primitive Q1, one leading to Primitive Q3, and one leading to Primitive Q4. A copy of the tracer message is outputted onto all three data streams, but the tracer message outputted into the loopback to Primitive Q1 is discarded once it is detected in the loop. The other copies of the tracer message travel to Primitives Q3 and Q4.

Primitive Q4 outputs the tracer message to Output Stream Y1. Primitive Q3 has two output data streams: one that leads to Primitive Q8 and one that leads to Primitive Q7. A copy of the tracer message is outputted onto both such data streams. Primitive Q7 outputs its copy of the tracer message to a stream that leads to Primitive Q8. Primitive Q8 joins the output of Primitives Q3 and Q7. Consequently, Primitive Q8 will receive the tracer message from both Primitive Q3 and Primitive Q7, assuming they are both executing properly and not stalled. Primitive Q8 will delete one of such tracer messages and output the other to Output Stream X1.

If and when a copy of the tracer message arrives in Output Streams X1 and Y1, the latency for Time Slice Z to travel through the execution graph to Output Streams X1 and Y1 can be calculated. Specifically, the end-to-end latency for Time Slice Z to travel to Output Stream X1 is the time elapsed from when the tracer message was inserted into Input Stream A1 until the time the tracer message reached Output Stream X1. Similarly, the end-to-end latency for Time Slice Z to travel to Output Stream Y1 is the time elapsed from when the tracer message was inserted into Input Stream A1 until the tracer message reached Output Stream Y1. By calculating latency from the time the tracer message is inserted in Input Stream A1, as opposed to when the execution graph is ready to start processing the tracer message, the end-to-end latency calculation includes the time messages have to be queued before they enter the execution graph. However, if including such queuing time is not desired, latency could be calculated from the time the tracer message enters the execution graph. The method described herein can be used to measure latency from any start point to any end point in the continuous processing system.

Calculating Latency Between Input Stream B1 and Output Stream X1 and Output Stream Y1.

For this example, let's assume we have a "Time Slice C" that includes one data message followed by a tracer message. Filter Primitive Q6 processes the data message prior to processing the tracer message. For example sake, assume the data message in Time Slice C is filtered out by Filter Primitive Q6 (i.e., it is not outputted by such primitive). The tracer message then has no message in front of it and so it quickly goes through Filter Primitive Q6 (tracer messages always pass through filters), Primitive Q4, and Primitive Q5. Although Primitive Q5 may delay the output of regular data messages, it outputs the tracer message without delay. Although no real data message from time slice B reached Output Stream Y1, the tracer message does reach Output Stream Y1, and, thus, the latency associated with Time Slice C can be calculated. Two copies of the tracer message will reach Output Stream Y1 (one from Primitive Q5 and one from Primitive Q4), and, consequently, one is deleted. Specifically, the tracer message that arrives second is discarded.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for measuring latency in a continuous processing system, where messages are pushed through a directed execution graph that comprises a set of connected primitives, the method comprising:
   generating a tracer message that is designed to pass through and be outputted by each primitive in the tracer message's path regardless of the function of the primitive and without changing the state of the primitive;
   inserting the tracer message in a queue in a data stream in the continuous processing system, wherein the tracer message is inserted at a desired start point for measuring latency;
   pushing the tracer message through the execution graph, wherein
      if one or more data messages precede the tracer messages in an input queue of a primitive, the primitive processes such tracer message only after processing such data message(s);
      if the tracer message passes through a primitive with a time delay for outputting data messages, the tracer message is outputted by the primitive without the time delay; and
      if a duplicate of the tracer message is detected at a single primitive in the execution graph, the duplicate is discarded; and
   at a desired end point for measuring latency, calculating the length of time the tracer message took to travel from the start point to the end point.

2. The method of claim 1, wherein, if the tracer message does not reach a desired end point within an acceptable time period, the continuous processing system is stalled at one or more points because the tracer message is designed to reach the desired end point regardless of the function of the primitives in the tracer message's path.

3. The method of claim 1, wherein, if a tracer message passes through a fork in the execution graph, the tracer message travels on all paths extending from the fork.

4. The method of claim 1, wherein the continuous processing system comprises an input adaptor, an output adaptor, and a query processor, and end-to-end latency for the continuous processing system is measured by making an input queue of the input adaptor the starting point and making an output queue of the output adaptor the end point.

5. The method of claim 1, wherein the continuous processing system includes a query processor, and latency of the query processor is measured by making an input queue of the query processor the starting point and making an output queue of the query processor the end point.

6. The method of claim 1, wherein the tracer message has the same timestamp as the data message proceeding the tracer message in the data stream at the starting point.

7. The method of claim 1, wherein tracer messages are periodically inserted into the data stream at the start point.

8. The method of claim 7, further comprising calculating a running average latency of the continuous processing system by calculating a running average of the latency of the tracer messages.

9. The method of claim 1, wherein data messages are processed by the continuous processing system in time slices, and the latency of a time slice is measured by inserting the tracer message after the last data message in the time slice.

10. The method of claim 1, wherein the tracer message is not altered as it passes through the execution graph.

11. The method of claim 1, wherein, if a tracer message is detected in a loop, such tracer message is discarded.

12. The method of claim 1, wherein, if duplicate copies of a tracer message arrive at a joiner primitive, one of the copies is discarded.

13. A method for measuring liveness in a continuous processing system, where messages are pushed through a directed execution graph that comprises a set of connected primitives, the method comprising:
 generating a tracer message;
 inserting the tracer message in a data stream in the continuous processing system, wherein the tracer message is inserted at a desired start point for measuring liveness;
 pushing the tracer message through the directed execution graph, wherein:
  if one or more data messages precede the tracer messages in an input queue of a primitive, the primitive processes such tracer message only after processing such data message(s);
  the tracer message is always outputted by any primitive in the tracer message's path, wherein the tracer message does not cause the state of the primitive to change;
  if the tracer message passes through a primitive with a time delay for outputting data messages, the tracer message is processed at the primitive and outputted without the time delay; and
  if a duplicate of the tracer message is detected at a single primitive in the execution graph, the duplicate is discarded; and
 at a desired end point for measuring liveness, determining if the tracer message made it to the end point within an acceptable time period.

14. The method of claim 13, wherein, if a tracer message is detected in a loop, such tracer message is discarded.

15. The method of claim 13, wherein, if duplicate copies of a tracer message arrive at a joiner primitive one of the copies is discarded.

\* \* \* \* \*